Patented Apr. 13, 1937

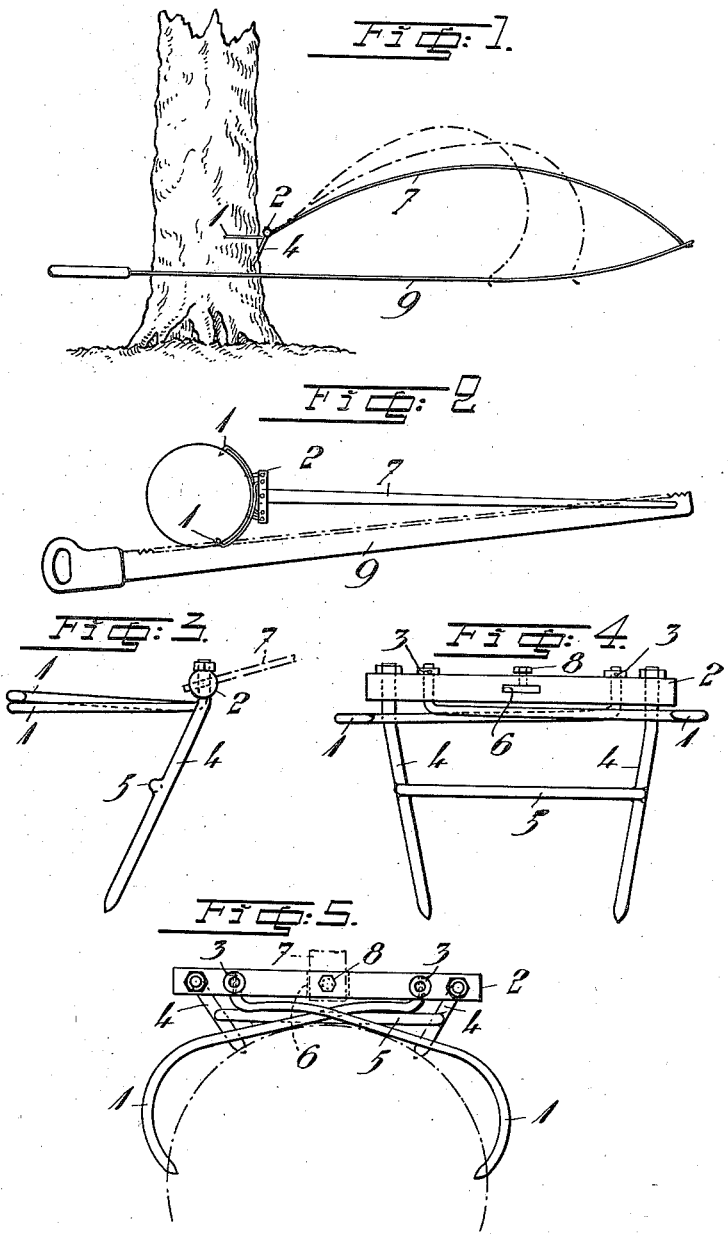

2,077,006

UNITED STATES PATENT OFFICE 2,077,006

TREE FELLING APPARATUS

Carl Fredrik Persson, Grangarde, Sweden

Application May 7, 1936, Serial No. 78,502
In Sweden April 29, 1935

1 Claim. (Cl. 143—62)

In felling trees by means of arm saws there are nowadays ordinarily used relatively thin saws. However, it is difficult for a single man to handle these saws, and, in view of this, various proposals have previously been made to replace helpers by auxiliary devices in which a spring tension influences the saw in a certain manner. These auxiliary devices have, however, been affected with certain disadvantages and, for this reason, they have not come into use to the extent primarily expected. Particularly the secure fastening of the auxiliary devices to the tree has caused difficulties or has called for more or less complicated and hence expensive arrangements. The mounting and the dismounting has, moreover, often been rather time-consuming.

The present invention relates to such tree felling apparatus consisting of a holding device arranged for being secured to the tree and a leaf spring extending from said device, its end engaging with the free end of a saw blade. The inconveniences in similar known apparatus are avoided in the present invention by the holding device, which consists of a cross bar upon which are pivoted a pair of crossed tongs legs adapted for gripping a tree trunk. These tongs legs are not interconnected. On the cross bar are also mounted a pair of standards or the like which form an angle with the plane of action of the tongs legs and which, resting with their lower ends against the tree trunk, form supports for the holding device.

The invention is illustrated on the accompanying drawing, in which—

Figure 1 shows a side view of the tree felling apparatus under consideration, applied in operative position to a tree, Figure 2 shows a top view of the apparatus, Figures 3 and 4 show the holding device viewed from two different sides, and Figure 5 shows a top view of the holding device.

According to the drawing, the holding device consists of two crossed but not directly interconnected tongs legs 1 which are pivotally secured to a cross bar 2, by means of bent ends inserted in apertures provided in the bar to which they are fastened by means of split pins 3 or the like. To the cross bar 2 are also secured in a suitable manner two standards 4 which are interconnected by means of a stay 5 and form a certain angle with the plane of seizure of the tongs legs. Besides, there is provided in the cross bar 2 an opening 6 in which one end of a leaf spring 7 may be inserted and be detachably secured by means of a clamping screw 8 or the like. At its free end the spring 7 is bent to form a hook which may be introduced into an aperture provided in the free end of the saw blade 9. According to the shown embodiment, the spring 7 is slightly arcuate, but there is nothing to prevent that a straight or substantially straight spring is used. The spring preferably narrows off towards its free end.

When using the apparatus, the tongs legs have only to be placed in a suitable gripping position relative to the tree, while at the same time the standards 4 and the stay 5 are brought to rest against the side of the tree (see Figure 1). In doing this, one preferably also actuates the holding device proper, or the spring 7 connected thereto, in the direction downwards, thus the tongs legs 1 being automatically swung somewhat towards each other so that a secure engagement is obtained, the standards 4 and the stay 5 at the same time affording a requisite support against the tree. Now the sawing can immediately begin, the spring 7 then acting as a helper, inasmuch as it is alternately tensioned and exerts a drawing action.

The detachment of the apparatus may evidently be effected by means of a simple manipulation, the holding device or the spring being actuated in the direction upwards and inwards towards the tree. Furthermore, the apparatus may be easily disassembled and the pieces be laid together to admit of an easy transport in the event of a removal of a greater distance. Mounting tools or the like need not be used in assembling or disassembling. The simple structure is obvious and evidently very advantageous from the point of view of manufacturing.

Changes as regards details may occur within the scope of the invention.

I claim:

Tree felling apparatus comprising a holding device arranged for being secured to a tree trunk and a leaf spring extending from said device and adapted to engage with the free end of a saw blade for the purpose of actuating the same, said holding device consisting of a cross bar, claw-like tongs legs pivoted thereon in a substantially horizontal plane for gripping the tree between them and upright standards which form a fixed angle with the plane of action of the tongs legs and adapted to bear against the tree by means of their lower ends and to form in this way supports for the holding device, said leaf-spring being removably secured in a slot formed in said cross bar.

CARL FREDRIK PERSSON.